US012682045B2

(12) United States Patent
Wu et al.

(10) Patent No.: US 12,682,045 B2
(45) Date of Patent: Jul. 14, 2026

(54) FAULT-ATTACK ANALYSIS DEVICE AND METHOD

(71) Applicant: Nuvoton Technology Corporation, Hsinchu Science Park (TW)

(72) Inventors: Kun-Yi Wu, Tainan City (TW); Yu-Shan Li, Tainan City (TW)

(73) Assignee: Nuvoton Technology Corporation, Hsinchu Science Park (TW)

( * ) Notice: Subject to any disclaimer, the term of this patent is extended or adjusted under 35 U.S.C. 154(b) by 195 days.

(21) Appl. No.: 18/537,075

(22) Filed: Dec. 12, 2023

(65) Prior Publication Data

US 2024/0220606 A1 Jul. 4, 2024

(30) Foreign Application Priority Data

Dec. 30, 2022 (TW) .................................. 111150794

(51) Int. Cl.
*G06F 21/54* (2013.01)
*G06F 21/60* (2013.01)
*G06F 21/72* (2013.01)
(52) U.S. Cl.
CPC ............ *G06F 21/54* (2013.01); *G06F 21/602* (2013.01); *G06F 21/72* (2013.01)
(58) Field of Classification Search
CPC ........ G06F 21/54; G06F 21/602; G06F 21/72; H04L 63/1416; H04L 9/40; H04L 9/0618; H04L 9/004
See application file for complete search history.

(56) References Cited

U.S. PATENT DOCUMENTS 7,570,767 B2 8/2009 Lo
8,386,791 B2 * 2/2013 Bevan ...................... H04L 9/004
380/268

(Continued)

FOREIGN PATENT DOCUMENTS

CN 105512573 A 4/2016
CN 107104783 A 8/2017

(Continued)

OTHER PUBLICATIONS

"Specification for the Advanced Encryption Standard (AES)", NIST, https://nvlpubs.nist.gov/nistpubs/fips/nist.fips.197.pdf (Year: 2001).*

*Primary Examiner* — Catherine Thiaw
*Assistant Examiner* — Amir Mahdi Hajiabbasi
(74) *Attorney, Agent, or Firm* — MUNCY, GEISSLER, OLDS & LOWE, P.C.

(57) ABSTRACT

An embodiment of the invention provides a fault-attack analysis device. The first encoder performs a first encoding operation on the first output result corresponding to the normal round calculation to generate a first encoding result. The first decoder performs a first decoding operation on the first encoding result to generate a first decoding result. The second encoder performs a second encoding operation on the second output result corresponding to the redundant round calculation to generate a second encoding result. The second decoder performs a second decoding operation on the second encoding result to generate a second decoding result. The second encoding operation and the second decoding operation are based on binary field addition. The comparison circuit compares the first decoding result to the second decoding result to perform a fault-attack analysis.

9 Claims, 5 Drawing Sheets

<u>100</u>

(56)                References Cited

U.S. PATENT DOCUMENTS

| | | | | |
|---|---|---|---|---|
| 2007/0189536 A1* | 8/2007 | Gammel | ................. | H04L 9/004 |
| | | | | 380/259 |
| 2011/0119762 A1* | 5/2011 | Teglia | .................... | G06F 21/52 |
| | | | | 726/23 |
| 2011/0296198 A1* | 12/2011 | Motoyama | ........... | H04L 9/0625 |
| | | | | 713/189 |
| 2016/0344409 A1* | 11/2016 | Adikari | ................ | H03M 13/611 |
| 2020/0004992 A1* | 1/2020 | Chong | ................ | G06F 21/6218 |
| 2020/0110906 A1* | 4/2020 | Choi | ........................ | G06F 21/70 |
| 2021/0050313 A1* | 2/2021 | Rietman | ................... | H01P 3/06 |
| 2023/0077946 A1* | 3/2023 | Kreimer | ............... | H04L 9/0618 |
| | | | | 713/189 |

FOREIGN PATENT DOCUMENTS

| | | | | | |
|---|---|---|---|---|---|
| CN | 108352981 A | | 7/2018 | | |
| CN | 112559236 A | * | 3/2021 | ............ | G06F 21/72 |
| EP | 2975549 A1 | * | 1/2016 | .......... | G06F 21/755 |
| JP | 2010021637 A | * | 1/2010 | | |
| TW | I521935 B | | 2/2016 | | |
| TW | 201904228 A | | 1/2019 | | |
| WO | WO-2009142190 A1 | * | 11/2009 | ............ | H04L 9/004 |

* cited by examiner

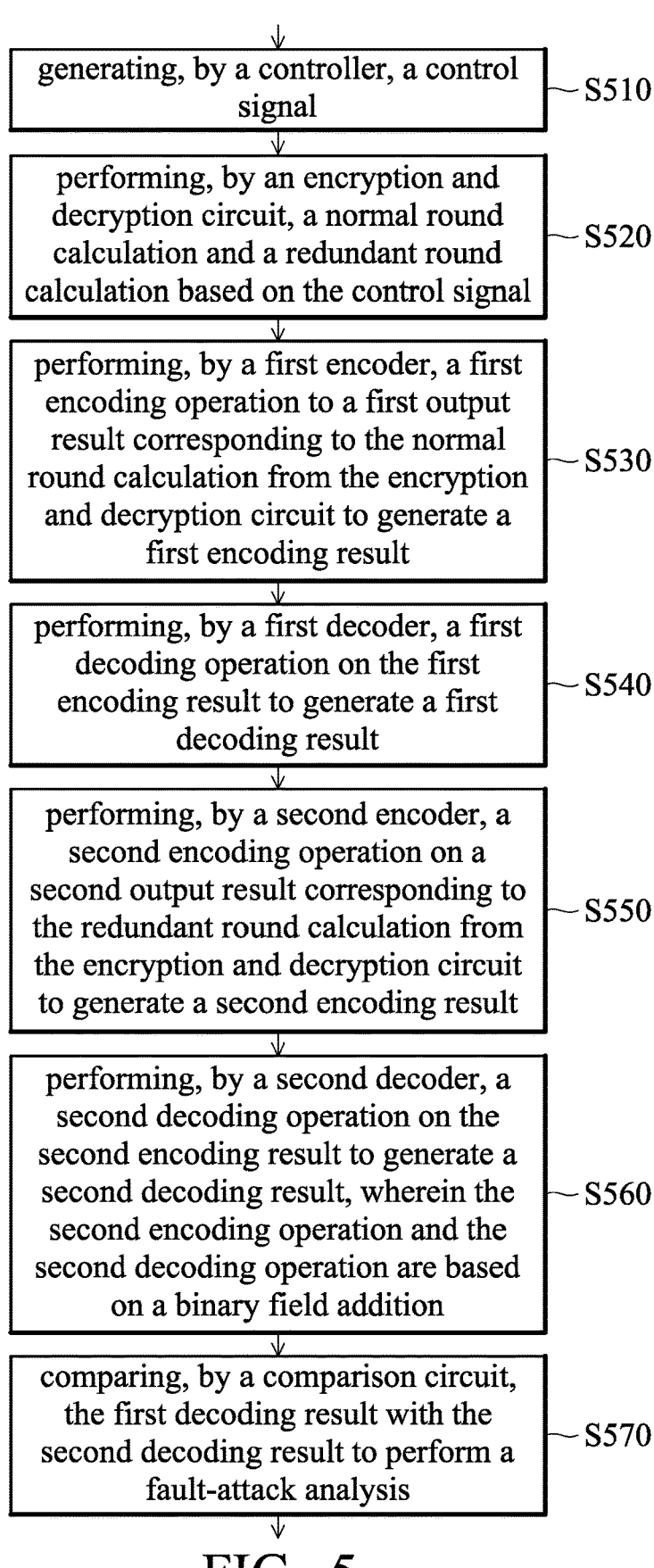

generating, by a controller, a control signal ⟶ S510 performing, by an encryption and decryption circuit, a normal round calculation and a redundant round calculation based on the control signal ⟶ S520 performing, by a first encoder, a first encoding operation to a first output result corresponding to the normal round calculation from the encryption and decryption circuit to generate a first encoding result ⟶ S530 performing, by a first decoder, a first decoding operation on the first encoding result to generate a first decoding result ⟶ S540 performing, by a second encoder, a second encoding operation on a second output result corresponding to the redundant round calculation from the encryption and decryption circuit to generate a second encoding result ⟶ S550 performing, by a second decoder, a second decoding operation on the second encoding result to generate a second decoding result, wherein the second encoding operation and the second decoding operation are based on a binary field addition ⟶ S560 comparing, by a comparison circuit, the first decoding result with the second decoding result to perform a fault-attack analysis ⟶ S570

FIG. 5

FAULT-ATTACK ANALYSIS DEVICE AND METHOD

CROSS REFERENCE TO RELATED APPLICATIONS

This application claims priority of TW Patent Application No. 111150794 filed on Dec. 30, 2022, the entirety of which is incorporated by reference herein.

BACKGROUND OF THE INVENTION

Field of the Invention

The invention generally relates to fault-attack analysis technology, and more particularly, to a fault-attack analysis technology in which binary field addition is applied to encoding and decoding.

Description of the Related Art

In fault-attack analysis methods, a fault may be added into the encryption and decryption system, and then differential correlation between multiple right calculations and wrong calculations will be analyzed. Then, according to the features of the encryption and decryption algorithms that are used, an equation for differential correlation is derived.

Therefore, in order to reduce the ability of an attacker to obtain data that has been encrypted and decrypted by the encryption and decryption system by performing a fault-attack, a fault-attack analysis device which can prevent the fault-attack effectively and easily is worthy of discussion.

BRIEF SUMMARY OF THE INVENTION

A fault-attack analysis device and method are provided to overcome the problems mentioned above.

An embodiment of the invention provides a fault-attack analysis device. The fault-attack analysis device includes a controller, an encryption and decryption circuit, a first encoder, a first decoder, a second encoder, a second decoder, a comparison circuit. The controller may generate a control signal. The encryption and decryption circuit is coupled to the controller, and performs a normal round calculation and a redundant round calculation based on the control signal. The first encoder is coupled to the encryption and decryption circuit and performs a first encoding operation on the first output result corresponding to the normal round calculation from the encryption and decryption circuit to generate a first encoding result. The first decoder is coupled to the encryption and decryption circuit, and performs a first decoding operation on the first encoding result to generate a first decoding result. The second encoder is coupled to the encryption and decryption circuit, and performs a second encoding operation on the second output result corresponding to the redundant round calculation from the encryption and decryption circuit to generate a second encoding result. The second decoder is coupled to the encryption and decryption circuit, and performs a second decoding operation on the second encoding result to generate a second decoding result, wherein the second encoding operation and the second decoding operation are based on binary field addition. The comparison circuit is coupled to the first decoder and the second decoder, and compares the first decoding result and the second decoding result to perform a fault-attack analysis. In an embodiment, the fault-attack analysis device further includes a first storage circuit and a second storage circuit.

The first storage circuit is coupled to the first encoder and the first decoder, and stores calculation result of each normal round of the normal round calculation. The second storage circuit is coupled to the second encoder and the second decoder, and stores calculation result of each redundant round of the redundant round calculation.

In an embodiment, the encryption and decryption circuit further includes a first encryption and decryption circuit. The first encryption and decryption circuit is coupled to the first encoder, the first decoder, the second encoder, and the second decoder. The first encryption and decryption circuit performs the normal round calculation based on the control signal to generate the first output result, and performs the redundant round calculation based on the control signal to generate the second output result.

In an embodiment, the encryption and decryption circuit further includes a first encryption and decryption circuit and a second encryption and decryption circuit. The first encryption and decryption circuit is coupled to the first encoder and the first decoder, and performs the normal round calculation based on the control signal to generate the first output result. The second encryption and decryption circuit is coupled to the second encoder and the second decoder, and performs the redundant round calculation based on the control signal to generate the second output result.

In an embodiment, the first encoding operation and the first decoding operation are different from the second encoding operation and the second decoding operation.

In an embodiment, in the first encoding operation, no encoding operation is performed and in the first decoding operation, no decoding operation is performed.

In an embodiment, the encryption and decryption circuit may use an Advanced Encryption Standard (AES) algorithm to perform the normal round calculation and the redundant round calculation. The second encoder may divide each output data of the second output result into a plurality of blocks, the second encoder may configure the blocks corresponding to each output data to different groups to generate a plurality of first variables, and the second encoder may perform the second encoding operation on the first variables to generate the second encoding result. The number of first variables is the same as the number of output data. The second decoder may perform the second decoding operation on the second encoding result to generate a plurality of second variables. The decoder may divide the second variables into a plurality of blocks. The second decoder may configure the blocks corresponding to each second variable to different groups to generate the second decoding result. The number of second variables is the same as the number of first variables.

In an embodiment, the second encoder comprises a plurality of first Exclusive-OR gates and the second decoder comprises a plurality of second Exclusive-OR gates, wherein the number of first Exclusive-OR gates is the same as the number of second Exclusive-OR gates.

An embodiment of the invention provides a fault-attack analysis method. The fault-attack analysis method is applied to a fault-attack analysis device. The fault-attack analysis method comprises the following steps. The controller of the fault-attack analysis device may generate a control signal. The encryption and decryption circuit of the fault-attack analysis device may perform a normal round calculation and a redundant round calculation based on the control signal. The first encoder of the fault-attack analysis device may perform a first encoding operation on the first output result corresponding to the normal round calculation from the encryption and decryption circuit to generate a first encoding result. The first decoder of the fault-attack analysis device may perform a first decoding operation on the first encoding result to generate a first decoding result. The second encoder of the fault-attack analysis device may perform a second encoding operation on the second output result corresponding to the redundant round calculation from the encryption and decryption circuit to generate a second encoding result. The second decoder of the fault-attack analysis device may perform a second decoding operation on the second encoding result to generate a second decoding result. The second encoding operation and the second decoding operation are based on binary field addition. The comparison circuit of the fault-attack analysis device may compare the first decoding result and the second decoding result to perform a fault-attack analysis.

Other aspects and features of the invention will become apparent to those with ordinary skill in the art upon review of the following descriptions of specific embodiments of a fault-attack analysis device and method.

BRIEF DESCRIPTION OF THE DRAWINGS

The invention will become more fully understood by referring to the following detailed description with reference to the accompanying drawings, wherein:

FIG. 5 is a flow chart illustrating a fault-attack analysis method according to an embodiment of the invention.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
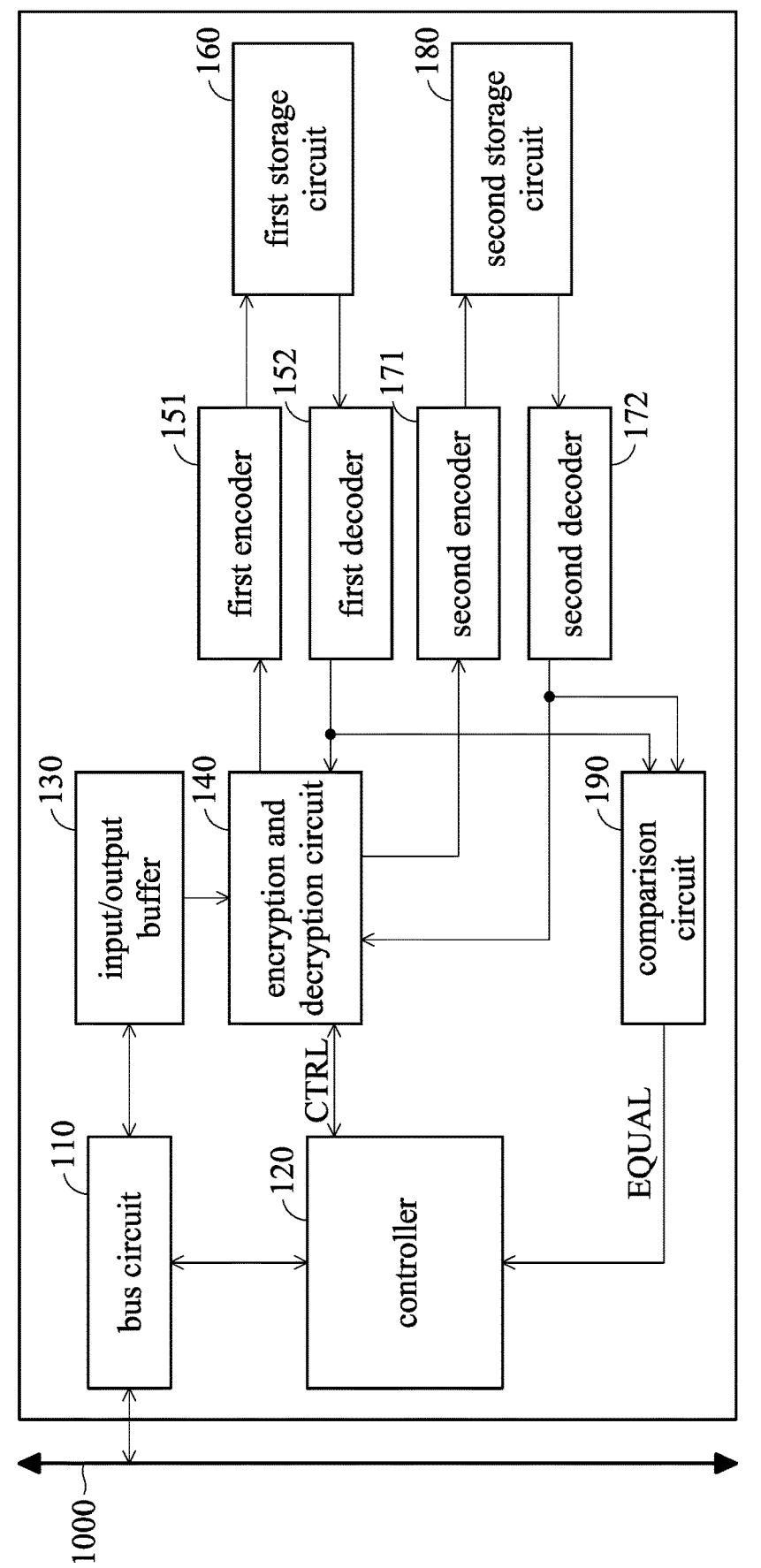
FIG. 1 is a block diagram of a d fault-attack analysis device 100 according to an embodiment of the invention.

FIG. 1 is a block diagram of a d fault-attack analysis device 100 according to an embodiment of the invention. As shown in FIG. 1, the fault-attack analysis device 100 may comprise a bus circuit (or bus interface) 110, a controller 120, an input/output buffer 130, an encryption and decryption circuit 140, a first encoder 151, a first decoder 152, a first storage circuit 160, a second encoder 171, a second decoder 172, a second storage circuit 180 and comparison circuit 190. It should be noted that FIG. 1 presents a simplified block diagram in which only the elements relevant to the invention are shown. However, the invention should not be limited to what is shown in FIG. 1. The fault-attack analysis device 100 may also comprise other elements.

According to the embodiments of the invention, the fault-attack analysis device 100 may be applied to integrated circuit or microcontroller (MCU), but the invention should not be limited thereto.

According to the embodiments of the invention, the bus circuit 110 may obtain the command from the external circuit of the fault-attack analysis device 100 through the bus 1000, transmit the command to the controller 120, and then transmit the response from the controller 120 to the bus 1000. In addition, the bus circuit 110 may transmit the data which needs to be encrypted or decrypted to the input/output buffer 130. Then, the data which needs to be encrypted or decrypted may be transmitted to the encryption and decryption circuit 140 through the input/output buffer 130. The bus circuit 110 may receive the data which has been encrypted or decrypted by the encryption and decryption circuit 140 from the input/output buffer 130, and transmit the data which has been encrypted or decrypted to the bus 1000.

According to the embodiments of the invention, the controller 120 may transmit the control signal CTRL to the encryption and decryption circuit 140 based on the command from the bus circuit 100 to encrypt or decrypt data. The encryption and decryption circuit 140 may perform an encryption operation or a decryption operation on the data from the input/output buffer 130 based on the control signal CTRL. When the encryption and decryption circuit 140 performs an encryption operation or a decryption operation on the data, the encryption and decryption circuit 140 may perform a normal round calculation and a redundant round calculation on the data from the input/output buffer 130.

According to embodiments of the invention, the encryption and decryption circuit 140 may perform the normal round calculation and the redundant round calculation based on an encryption and decryption algorithm (e.g., Advanced Encryption Standard (AES)). In the normal round calculation and the redundant round calculation, the encryption and decryption circuit 140 may perform multiple rounds of an encryption and decryption algorithm. In the embodiment of FIG. 1, the encryption and decryption circuit 140 performs a normal round calculation first, and then it performs the redundant round calculation. In the normal round calculation and the redundant round calculation, the calculation result of the prior round may be used as the input data in the next round. The details are illustrated below.

According to embodiments of the invention, the first storage circuit 160 and the second storage circuit 180 may be memories or registers. The first storage circuit 160 may store the calculation result (or calculation state) of each normal round of the normal round calculation, and the second storage circuit 180 may store the calculation result (or calculation state) of each redundant round of the redundant round calculation.

In first round of normal round calculation, the encryption and decryption circuit 140 may perform the encryption and decryption algorithm (e.g., AES algorithm) on the initial data from the input/output buffer 130 to generate a first normal round calculation result. Then, the first encoder 151 may perform an encoding operation on the first normal round calculation result, and store the encoded first normal round calculation result in the first storage circuit 160. Then, the first decoder 152 may perform the decoding operation on the first normal round calculation result stored in the first storage circuit 160, and transmit the decoded first normal round calculation result to the encryption and decryption circuit 140 to be the input data of the second round of normal round calculation. Accordingly, when the last round of the normal round calculation has been performed, the first decoder 152 may transmit the decoded last normal round calculation result to the comparison circuit 190.

Similar to normal round calculation, in first round of redundant round calculation, the encryption and decryption circuit 140 may perform the encryption and decryption algorithm (e.g., AES algorithm) on the initial data from the input/output buffer 130 to generate a first redundant round calculation result. Then, the second encoder 171 may perform an encoding operation on the first redundant round calculation result, and store the encoded first redundant round calculation result in the second storage circuit 180. Then, the second decoder 172 may perform the decoding operation on the first redundant round calculation result stored in the second storage circuit 180, and transmit the decoded first redundant round calculation result to the encryption and decryption circuit 140 to be the input data of the second round of redundant round calculation. Accordingly, when the last round of redundant round calculation has been performed, the second decoder 172 may transmit the decoded last redundant round calculation result to the comparison circuit 190.

When the comparison circuit 190 receives the decoded last normal round calculation result from the first decoder 152 and the decoded last redundant round calculation result from the second decoder 172, the comparison circuit 190 may compare the decoded last normal round calculation result to the decoded last redundant round calculation result to determine whether the decoded last normal round calculation result and the decoded last redundant round calculation result are the same.

When the decoded last normal round calculation result and the decoded last redundant round calculation result are the same, the comparison circuit 190 may transmit a comparison result EQUAL (e.g., the value of comparison result EQUAL is 1) to the controller 120 to tell the controller 120 that no fault occurs in the encryption/decryption calculation of the encryption and decryption circuit 140 (i.e., the encryption/decryption calculation is not attacked). Therefore, the controller 120 may indicate the input/output buffer 130 to transmit the data encrypted or decrypted by the encryption and decryption circuit 140 to the bus 1000.

When the decoded last normal round calculation result and the decoded last redundant round calculation result are not the same, the comparison circuit 190 may transmit a comparison result EQUAL (e.g., the value of comparison result EQUAL is 0) to the controller 120 to tell the controller 120 that the fault occurs in the encryption/decryption calculation of the encryption and decryption circuit 140 (i.e., the encryption/decryption calculation may be attacked). The controller 120 may cancel the encrypted or decrypted data stored in the first storage device 160 and the second storage device 180, and indicate the encryption and decryption circuit 140 to perform the normal round calculation and the redundant round calculation again.

Figure 2:
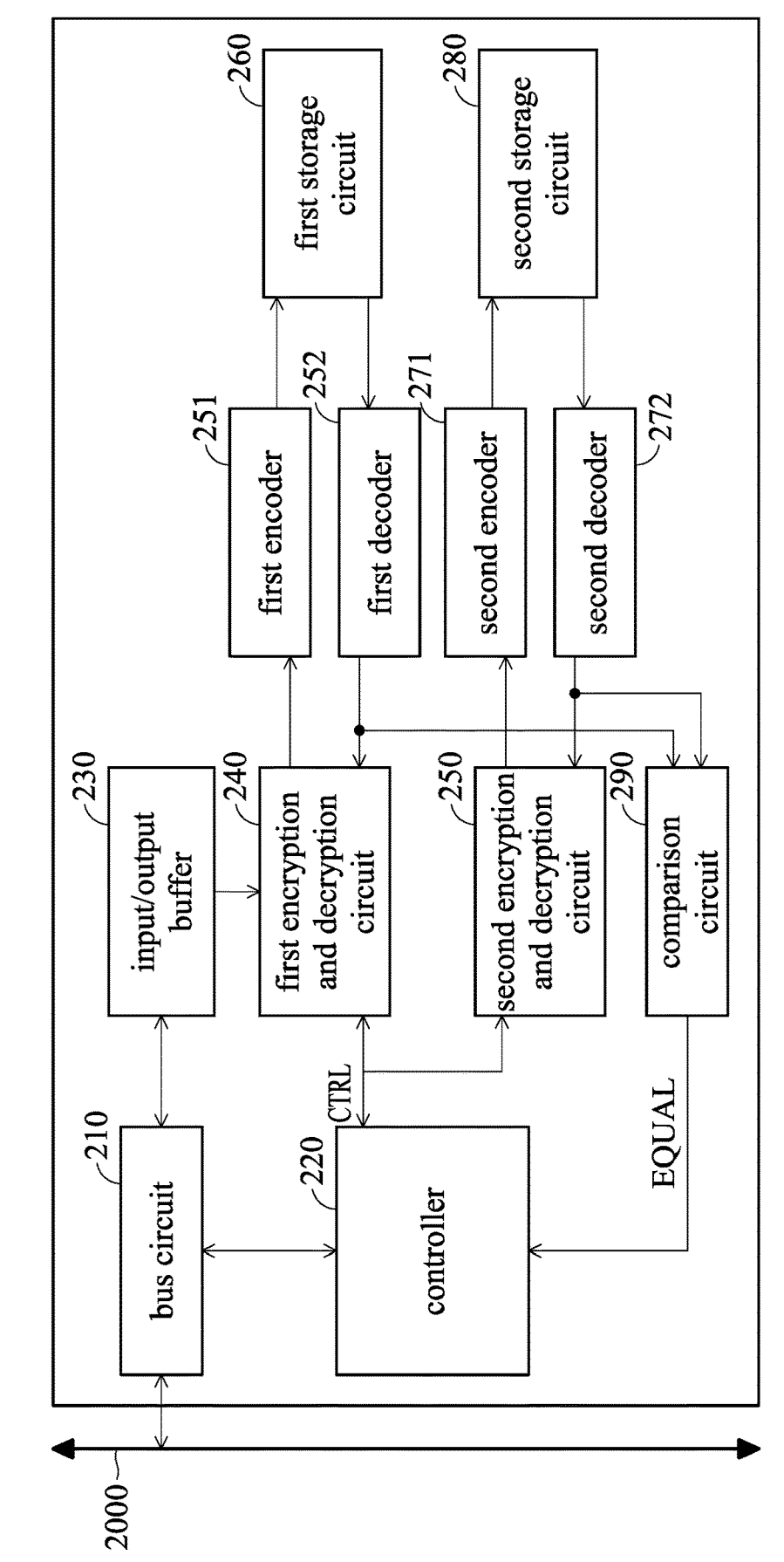
FIG. 2 is a block diagram of a d fault-attack analysis device 200 according to another embodiment of the invention.

FIG. 2 is a block diagram of a d fault-attack analysis device 200 according to another embodiment of the invention. As shown in FIG. 2, the fault-attack analysis device 200 may comprise a bus circuit (or bus interface) 210, a controller 220, an input/output buffer 230, a first encryption and decryption circuit 240, a second encryption and decryption circuit 250, a first encoder 251, a first decoder 252, a first storage circuit 260, a second encoder 271, a second decoder 272, a second storage circuit 280 and a comparison circuit 290. It should be noted that FIG. 2 presents a simplified block diagram in which only the elements relevant to the invention are shown. However, the invention should not be limited to what is shown in FIG. 2. The fault-attack analysis device 200 may also comprise other elements.

Comparing to the fault-attack analysis device 100, the fault-attack analysis device 200 is configured the first encryption and decryption circuit 240 and the second encryption and decryption circuit 250. The first encryption and decryption circuit 240 may be coupled to the first encoder 251 and first decoder 252. The second encryption and decryption circuit 250 may be coupled to the first encoder 271 and first decoder 272. The first encryption and decryption circuit 240 may be configured to perform a normal round calculation on the data from the input/output buffer 230. The second encryption and decryption circuit 250 may be configured to perform a redundant round calculation on the data from the input/output buffer 230. That is, the normal round calculation and the redundant round calculation can be performed at the same time.

The operations of other elements of the fault-attack analysis device 200 are similar to the fault-attack analysis device 100, details will not be illustrated again.

Figure 3:
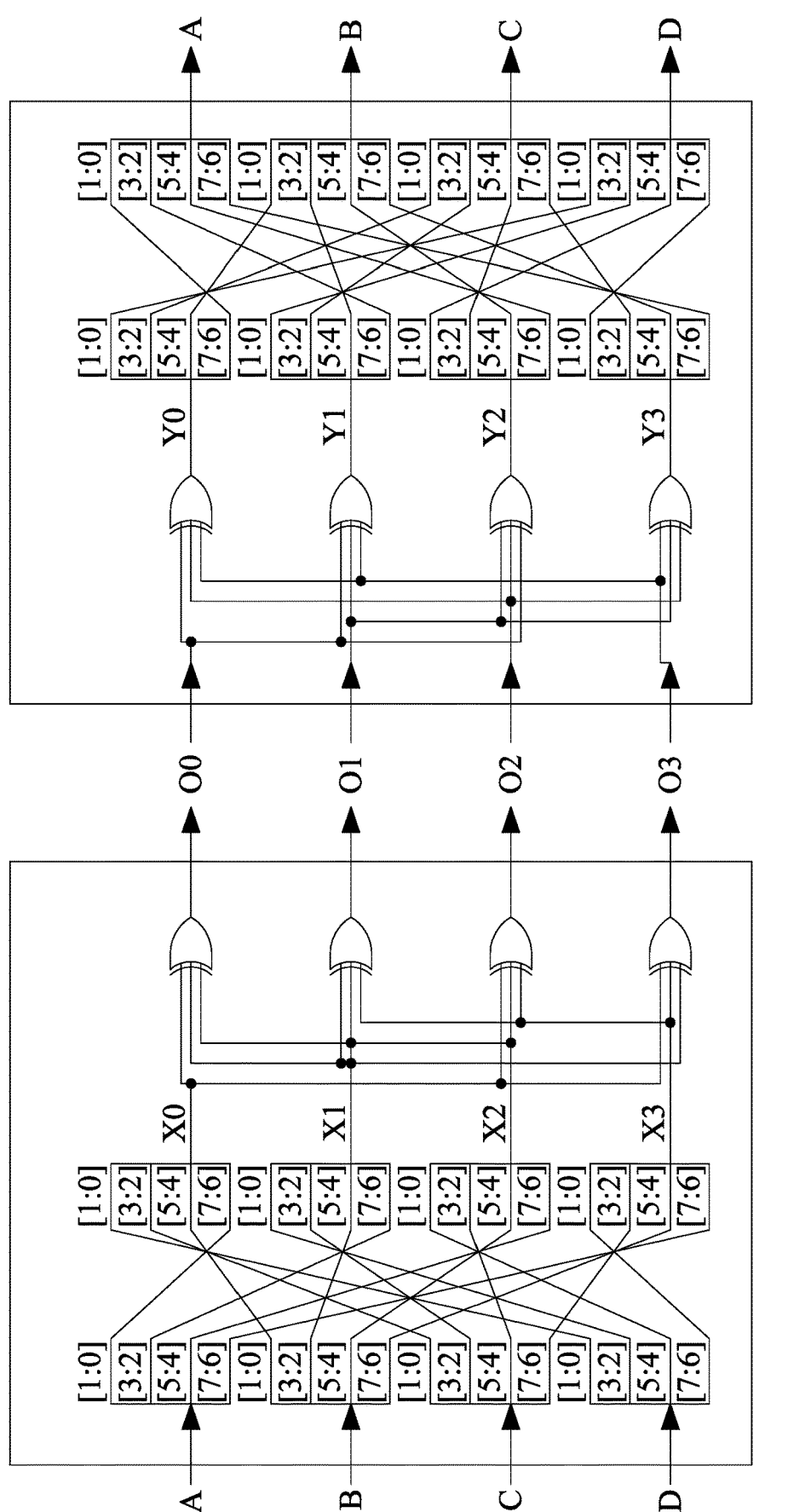
FIG. 3 is a schematic diagram illustrating binary field addition-based encoding operation and decoding operation according to an embodiment of the invention.

According to the embodiments of the invention, the first encoder 151 (or first encoder 251) and second encoder 171 (or second encoder 271) may perform different encoding operations, and the first decoder 152 (or first decoder 252) and second decoder 172 (or second decoder 272) may perform different encoding operations. In an embodiment, the first encoder 151 and the first decoder 152 may not perform any encoding or decoding operations. That is, in the embodiment, in normal round calculation, the first encoder 151 and the first decoder 152 may not perform an encoding operation or a decoding operation on the calculation result output by the encryption and decryption circuit 140. According to an embodiment of the invention, the encoding operation and decoding operation performed by the second encoder 171 and the second decoder 172 may be the binary field addition-based encoding operation and decoding operation. FIG. 3 is used as an example for illustration below.

FIG. 3 is a schematic diagram illustrating binary field addition-based encoding operation and decoding operation according to an embodiment of the invention. As shown in FIG. 3, after the encoder obtains 4 bytes output data A[7:0], B[7:0], C[7:0] and D[7:0] from the encryption and decryption circuit (i.e., each output data is 1 byte), the encoder may equally divide each output data A[7:0], B[7:0], C[7:0] and D[7:0] into 2-bits block (i.e., output data A[7:0] is divided into A[1:0], A[3:2], A[5:4] and A[7:6], output data B[7:0] is divided into B[1:0], B[3:2], B[5:4] and B[7:6], output data C[7:0] is divided into C[1:0], C[3:2], C[5:4] and C[7:6], and output data D[7:0] is divided into D[1:0], D[3:2], D[5:4] and D[7:6]). Then, the encoder may configure the blocks of each output data A[7:0], B[7:0], C[7:0] and D[7:0] to different groups to generate first variables X0, X1, X2 and X3. The first variables X0, X1, X2 and X3 may be shown below:

$$X0 = \{A[1:0], B[1:0], C[1:0], D[1:0]\}$$
$$X1 = \{A[3:2], B[3:2], C[3:2], D[3:2]\}$$
$$X2 = \{A[5:4], B[5:4], C[5:4], D[5:4]\}$$
$$X3 = \{A[7:6], B[7:6], C[7:6], D[7:6]\}$$

Then, the encoder may select three variables from the first variables X0, X1, X2 and X3 to perform a binary field addition calculation (i.e., Exclusive-OR calculation) to generate encoding results O0, O1, O2 and O3. The encoder may comprise four Exclusive-OR gates to respectively perform binary field addition calculations (i.e., Exclusive-OR calculations) on different selection results to generate encoding results O0, O1, O2 and O3. The encoding results O0, O1, O2 and O3 are shown below:

$$O0 = X0 \oplus X1 \oplus X2$$

$$O1 = X1 \oplus X2 \oplus X3$$

$$O2 = X0 \oplus X2 \oplus X3$$

$$O3 = X0 \oplus X1 \oplus X3$$

Then, the decoder may obtain the encoding results O0, O1, O2 and O3 from the storage circuit, and select three encoding results from the encoding results O0, O1, O2 and O3 to perform the binary field addition calculation (i.e., Exclusive-OR calculation) to generate second variables Y0, Y1, Y2 and Y3. The decoder may comprise four Exclusive-OR gates to respectively perform binary field addition calculations (i.e., Exclusive-OR calculation) on different selection results to generate second variables Y0, Y1, Y2 and Y3. The operations of encoder and decoder may be corresponded each other to make the second variables Y0, Y1, Y2 and Y3 be corresponded to the first variables X0, X1, X2 and X3 respectively. The second variables Y0, Y1, Y2 and Y3 are shown below $$Y0 = O0 \oplus O2 \oplus O3$$

$$Y1 = O0 \oplus O1 \oplus O3$$

$$Y2 = O0 \oplus O1 \oplus O2$$

$$Y3 = O1 \oplus O2 \oplus O3$$

The decoder may substitute the encoding results O0, O1, O2 and O3 into the second variables Y0, Y1, Y2 and Y3 as follow:

$$Y0 = (X0 \oplus X1 \oplus X2) \oplus (X0 \oplus X2 \oplus X3) \oplus (X0 \oplus X1 \oplus X3) = X0$$

$$Y1 = (X0 \oplus X1 \oplus X2) \oplus (X1 \oplus X2 \oplus X3) \oplus (X0 \oplus X1 \oplus X3) = X1$$

$$Y2 = (X0 \oplus X1 \oplus X2) \oplus (X1 \oplus X2 \oplus X3) \oplus (X0 \oplus X2 \oplus X3) = X2$$

$$Y3 = (X1 \oplus X2 \oplus X3) \oplus (X0 \oplus X2 \oplus X3) \oplus (X0 \oplus X1 \oplus X3) = X3$$

i.e., $$Y0 = \{A[1:0], B[1:0], C[1:0], D[1:0]\}$$

$$Y1 = \{A[3:2], B[3:2], C[3:2], D[3:2]\}$$

$$Y2 = \{A[5:4], B[5:4], C[5:4], D[5:4]\}$$

$$Y3 = \{A[7:6], B[7:6], C[7:6], D[7:6]\}$$

Therefore, the decoder may generate the decoding results A, B, C and D according to the second variables Y0, Y1, Y2 and Y3. The decoding results A, B, C and D are shown below:

$$A = \{Y[7:6], Y[7:6], Y[7:6], Y[7:6]\}$$

$$B = \{Y[5:4], Y[5:4], Y[5:4], Y[5:4]\}$$

$$C = \{Y[3:2], Y[3:2], Y[3:2], Y[3:2]\}$$

$$D = \{Y[1:0], Y[1:0], Y[1:0], Y[1:0]\}$$

Figure 4:
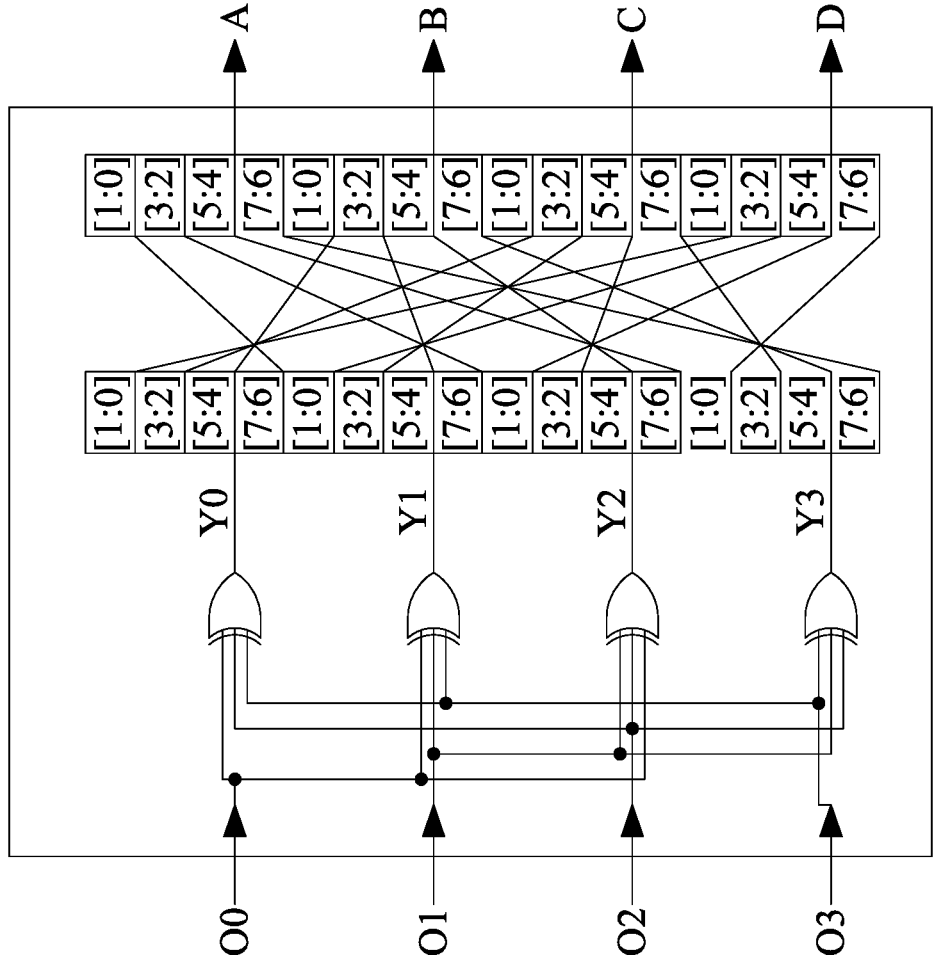
FIG. 4 is a schematic diagram illustrating fault according to an embodiment of the invention.

FIG. 4 is a schematic diagram illustrating fault according to an embodiment of the invention. As shown in FIG. 4, it is assumed the encoding result O1 is attacked, the second variables Y0, Y1, Y2 and Y3 may be affected by the attack. When the second variables Y0, Y1, Y2 and Y3 which are affected by the attack are decoded, the decoding results A[1:0], A[3:2], A[5:4], B[1:0], B[3:2], B[5:4], C[1:0], C[3:2], C[5:4] D[1:0], D[3:2] and D[5:4] may affected by the attack. That is, when 1 byte decoding results of 4 bytes decoding results are attacked, 24 bits decoding result will be affected. Therefore, in the invention, the binary field addition calculation (i.e., Exclusive-OR calculation) is applied to perform an encoding operation and a decoding operation, the 16-bit security requirement (i.e., when 1 byte is attacked, at least 16 bits are affected) of the current technology can be met to prevent the single fault attack of the attacker.

FIG. 5 is a flow chart illustrating a fault-attack analysis method according to an embodiment of the invention. The fault-attack analysis method can be applied to the fault-attack analysis device 100 and the fault-attack analysis device 200. As shown in FIG. 5, in step S510, a controller of the fault-attack analysis device may generate a control signal.

In step S520, an encryption and decryption circuit of the fault-attack analysis device may perform a normal round calculation and a redundant round calculation based on the control signal. In the fault-attack analysis method, the encryption and decryption circuit may use an Advanced Encryption Standard (AES) algorithm to perform the normal round calculation and the redundant round calculation.

In step S530, a first encoder of the fault-attack analysis device may perform a first encoding operation on the first output result corresponding to the normal round calculation from the encryption and decryption circuit to generate a first encoding result.

In step S540, a first decoder of the fault-attack analysis device may perform a first decoding operation on the first encoding result to generate a first decoding result.

In step S550, a second encoder of the fault-attack analysis device may perform a second encoding operation on the second output result corresponding to the redundant round calculation from the encryption and decryption circuit to generate a second encoding result.

In step S560, a second decoder of the fault-attack analysis device may perform a second decoding operation on the second encoding result to generate a second decoding result. In the fault-attack analysis method, the second encoding operation and the second decoding operation may be based on binary field addition.

In step S570, a comparison circuit of the fault-attack analysis device may compare the first decoding result (i.e., the decoded last normal round calculation result) and the second decoding result (i.e., the decoded last redundant round calculation result) to perform the fault-attack analysis.

According to an embodiment of the invention, in the fault-attack analysis method, a first storage circuit of the fault-attack analysis device may store the calculation result of each normal round of the normal round calculation, and a second storage circuit of the fault-attack analysis device may store the calculation result of each redundant round of the redundant round calculation.

According to an embodiment of the invention, in the fault-attack analysis method, a first encryption and decryption circuit of the encryption and decryption circuit (i.e., the encryption and decryption circuit may comprise only one encryption and decryption circuit) may perform the normal round calculation based on the control signal to generate the first output result, and perform the redundant round calculation based on the control signal to generate the second output result.

According to an embodiment of the invention, in the fault-attack analysis method, a first encryption and decryption circuit of the encryption and decryption circuit may perform the normal round calculation based on the control signal to generate the first output result, and a second encryption and decryption circuit of the encryption and decryption circuit may perform the redundant round calculation based on the control signal to generate the second output result.

According to an embodiment of the invention, in the fault-attack analysis method, the second encoder may divide each output data of the second output result into a plurality of blocks, the second encoder may configure the blocks corresponding to each output data to different groups to generate a plurality of first variables, and the second encoder may perform the second encoding operation on the first variables to generate the second encoding result. The number of first variables is the same as the number of output data.

According to an embodiment of the invention, in the fault-attack analysis method, the second decoder may perform the second decoding operation on the second encoding result to generate a plurality of second variables, the decoder may divide the second variables into a plurality of blocks, and the second decoder may configure the blocks corresponding to each second variable to different groups to generate the second decoding result. The number of second variables is the same as the number of first variables.

According to the fault-attack analysis method provided in the invention, the design for the encoder or decoder of the fault-attack analysis device may use fewer elements (e.g., Exclusive-OR gate) to meet the security requirement. Therefore, the cost for the fault-attack analysis device will be saved. In addition, according to the fault-attack analysis method provided in the invention, the binary field addition is applied to the encoding operation and the decoding operation to reduce the encoding delay and decoding delay.

Use of ordinal terms such as "first", "second", "third", etc., in the disclosure and claims is for description. It does not by itself connote any order or relationship.

The steps of the method described in connection with the aspects disclosed herein may be embodied directly in hardware, in a software module executed by a processor, or in a combination of the two. A software module (e.g., including executable instructions and related data) and other data may reside in a data memory such as RAM memory, flash memory, ROM memory, EPROM memory, EEPROM memory, registers, a hard disk, a removable disk, a CD-ROM, or any other form of computer-readable storage medium known in the art. A sample storage medium may be coupled to a machine such as, for example, a computer/ processor (which may be referred to herein, for convenience, as a "processor") such that the processor can read information (e.g., code) from and write information to the storage medium. A sample storage medium may be integral to the processor. The processor and the storage medium may reside in an ASIC. The ASIC may reside in user equipment. Alternatively, the processor and the storage medium may reside as discrete components in user equipment. Moreover, in some aspects any suitable computer-program product may comprise a computer-readable medium comprising codes relating to one or more of the aspects of the disclosure. In some aspects a computer program product may comprise packaging materials.

The above paragraphs describe many aspects. Obviously, the teaching of the invention can be accomplished by many methods, and any specific configurations or functions in the disclosed embodiments only present a representative condition. Those who are skilled in this technology will understand that all of the disclosed aspects in the invention can be applied independently or be incorporated.

While the invention has been described by way of example and in terms of preferred embodiment, it should be understood that the invention is not limited thereto. Those who are skilled in this technology can still make various alterations and modifications without departing from the scope and spirit of this invention. Therefore, the scope of the present invention shall be defined and protected by the following claims and their equivalents.

What is claimed is:

1. A fault-attack analysis device, comprising: a controller, generating a control signal; an encryption and decryption circuit, coupled to the controller, and performing a first round calculation based on the control signal to generate a first output result and a second round calculation based on the control signal to generate a second output result; a first encoder, coupled to the encryption and decryption circuit, and performing a first encoding operation on the first output result from the encryption and decryption circuit to generate a first encoding result; a first decoder, coupled to the encryption and decryption circuit, and performing a first decoding operation on the first encoding result to generate a first decoding result; a second encoder, coupled to the encryption and decryption circuit, and performing a second encoding operation on the second output result from the encryption and decryption circuit to generate a second encoding result; a second decoder, coupled to the encryption and decryption circuit, and performing a second decoding operation on the second encoding result to generate a second decoding result, wherein the second encoding operation and the second decoding operation are based on a binary field addition; and a comparison circuit, coupled to the first decoder and the second decoder, and comparing the first decoding result and the second decoding result to perform a fault-attack analysis.

2. The fault-attack analysis device of claim 1, further comprising: a first storage circuit, coupled to the first encoder and the first decoder, and storing calculation result of each round of the first round calculation; and a second storage circuit, coupled to the second encoder and the second decoder, and storing calculation result of each round of the second round calculation.

3. The fault-attack analysis device of claim 1, wherein the encryption and decryption circuit further comprises: a first encryption and decryption circuit, coupled to the first encoder, the first decoder, the second encoder and the second decoder, performing the first round calculation based on the control signal to generate the first output result, and performing the second round calculation based on the control signal to generate the second output result.

4. The fault-attack analysis device of claim 1, wherein the encryption and decryption circuit further comprises: a first encryption and decryption circuit, coupled to the first encoder and the first decoder, and performing the first round calculation based on the control signal to generate the first output result; and a second encryption and decryption circuit, coupled to the second encoder and the second decoder, and performing the second round calculation based on the control signal to generate the second output result.

5. The fault-attack analysis device of claim 1, wherein the first encoding operation and the first decoding operation are different from the second encoding operation and the second decoding operation.

6. The fault-attack analysis device of claim 1, wherein the second encoder comprises a plurality of first Exclusive-OR gates and the second decoder comprises a plurality of second Exclusive-OR gates, wherein a number of the plurality of first Exclusive-OR gates is the same as a number of the second Exclusive-OR gates.

7. A fault-attack analysis method, applied to a fault-attack analysis device, comprising: generating, by a controller of the fault-attack analysis device, a control signal; performing, by an encryption and decryption circuit of the fault-attack analysis device, a first round calculation based on the control signal to generate a first output result and a second round calculation based on the control signal to generate a second output result; performing, by a first encoder of the fault-attack analysis device, a first encoding operation to the first output result to generate a first encoding result; performing, by a first decoder of the fault-attack analysis device, a first decoding operation on the first encoding result to generate a first decoding result; performing, by a second encoder of the fault-attack analysis device, a second encoding operation on the second output result to generate a second encoding result; performing, by a second decoder of the fault-attack analysis device, a second decoding operation on the second encoding result to generate a second decoding result, wherein the second encoding operation and the second decoding operation are based on a binary field addition; and comparing, by a comparison circuit of the fault-attack analysis device, the first decoding result with the second decoding result to perform a fault-attack analysis.

8. The fault-attack analysis method of claim 7, further comprising: performing, by the encryption and decryption circuit, the first round calculation and the second round calculation according to an Advanced Encryption Standard (AES) algorithm.

9. The fault-attack analysis method of claim 8, further comprising:

dividing, by the second encoder, each output data of the second output result into a plurality of blocks;

configuring, by the second encoder, the blocks corresponding to each output data into different groups to generate a plurality of first variables; and performing, by the second encoder, the second encoding operation on the plurality of first variables to generate the second encoding result, wherein a number of the first variables is the same as a number of the output data.

* * * * *